United States Patent
Wong et al.

(10) Patent No.: US 8,446,505 B2
(45) Date of Patent: May 21, 2013

(54) ROW AND COLUMN JUMPING FOR PIXEL READOUT USING BURST SWITCHING MODE

(75) Inventors: Mark Ging Yeon Wong, Sarawak (MY); Zi Hao Tan, Kelantan (MY); Shan Chong Tan, Penang (MY); Willie Song, Penang (MY)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 337 days.

(21) Appl. No.: 12/913,262

(22) Filed: Oct. 27, 2010

(65) Prior Publication Data

US 2012/0105661 A1    May 3, 2012

(51) Int. Cl.
  *H04N 3/14*    (2006.01)
  *H04N 5/76*    (2006.01)
(52) U.S. Cl.
  USPC .................. 348/302; 348/231.3; 348/294
(58) Field of Classification Search .................. 348/207, 348/231, 294, 302, 303, 304, 307, 308, 309, 348/231.3, 240.2
  See application file for complete search history.

(56) References Cited

U.S. PATENT DOCUMENTS

| | | | |
|---|---|---|---|
| 6,124,888 A * | 9/2000 | Terada et al. | 348/302 |
| 6,512,858 B2 | 1/2003 | Lyon et al. | |
| 6,603,454 B1 | 8/2003 | Nakamura et al. | |
| 6,784,928 B1 | 8/2004 | Sakurai et al. | |
| 6,867,803 B1 * | 3/2005 | Funamoto | 348/294 |
| 7,262,801 B2 * | 8/2007 | Saika | 348/304 |
| 2002/0018600 A1 * | 2/2002 | Lyon et al. | 382/305 |
| 2005/0041143 A1 * | 2/2005 | Kakiuchi et al. | 348/370 |
| 2007/0052813 A1 * | 3/2007 | Neter | 348/222.1 |
| 2007/0098264 A1 | 5/2007 | Van Lier et al. | |
| 2007/0146514 A1 * | 6/2007 | Maeda et al. | 348/294 |
| 2007/0268459 A1 * | 11/2007 | Childers et al. | 353/31 |
| 2008/0162997 A1 | 7/2008 | Vu et al. | |

* cited by examiner

*Primary Examiner* — Hung Lam

(57) ABSTRACT

An imaging apparatus is described for obtaining images. The imaging apparatus includes a pixel array, a row decoder, a column decoder, and a trigger circuit. The pixel array integrates electrical signals corresponding to incident light from a scene. The row decoder enables a selected row of pixels within the pixel array. The column decoder enables readout of a pixel in a selected column of the selected row within the pixel array. The trigger circuit generates one or more burst pulses to traverse through a corresponding number of decoder stages that correspond to pixels which are identified for discarding. Each burst pulse has a duration that is less than a stipulated minimum pulse duration of a typical decoder pulse of the decoders. By using shorter burst pulses, the trigger circuit can quickly jump to a desired row and/or column of pixels for readout, while conserving power.

16 Claims, 11 Drawing Sheets

ROW AND COLUMN JUMPING FOR PIXEL READOUT USING BURST SWITCHING MODE

BACKGROUND

Conventional pixel arrays are used to generate electronic images that represent a scene to which the pixel array is exposed. The conventional method of reading a pixel array is done by sequentially channeling the data from individual pixels in the pixel array. In other words, the pixels values in the pixel array are read out in a sequential manner for further processing.

In some imaging scenarios, it is unnecessary to have pixel values for every pixel in the array. As one example, in certain non-navigation related functions like finger presence detection where only a subset of pixel information is sufficient, only one or two rows of pixels statistic is used to determine whether or not a finger is present on an optical finger navigation (OFN) module. In another example using an optical mouse sensor, less than all of the pixel information from the pixel array could be used in a rest mode to sample the surface at certain intervals to check if a wakeup/transition to run mode is appropriate.

Unfortunately, many conventional imaging devices read out all pixel info in the entire array due to the limitation of the row and column decoders that work in a sequential fashion. Reading out more information than necessary can be considered wasteful in terms of power consumption and processing time. Other types of conventional imaging devices attempt to control the starting and stopping stages of which pixels will be read out. However, these conventional techniques are either inefficient or do not work well in certain situations.

SUMMARY

Embodiments of an apparatus are described. In one embodiment, the apparatus is an imaging apparatus for obtaining images. An embodiment of the imaging apparatus includes a pixel array, a row decoder, a column decoder, and a trigger circuit. The pixel array integrates electrical signals corresponding to incident light from a scene. The row decoder enables a selected row of pixels within the pixel array. The column decoder enables readout of a pixel in a selected column of the selected row within the pixel array. The trigger circuit generates one or more burst pulses to traverse through a corresponding number of decoder stages that correspond to pixels which are identified for discarding. Each burst pulse has a duration that is less than a stipulated minimum pulse duration of a typical decoder pulse of the decoders. By using shorter burst pulses, the trigger circuit can quickly jump to a desired row and/or column of pixels for readout, while conserving power. Other embodiments of the imaging apparatus are also described.

Embodiments of a trigger circuit are also described. In one embodiment, the trigger circuit includes a row decoder output channel, a column decoder output channel, and a burst pulse generator. The row decoder output channel is coupled to a row decoder of a pixel array. The row decoder enables a selected row of pixels within the pixel array. The column decoder output channel is coupled to a column decoder of the pixel array. The column decoder enables readout of a pixel in a selected column of the selected row of pixels within the pixel array. The burst pulse generator is coupled to at least one of the decoder output channels. The burst pulse generator generates one or more burst pulses to traverse through a corresponding number of decoder stages that correspond to pixels which are identified for discarding. Each burst pulse has a duration that is less than a stipulated minimum pulse duration of a typical decoder pulse of the decoders. Other embodiments of the trigger circuit are also described.

Embodiments of a method are also described. In one embodiment, the method is a method for operating decoders of an optical imaging device. One embodiment of the method includes obtaining an indication of a subset of selected pixels of a pixel array. The remaining pixels outside of the subset of selected pixels are identified as pixels to be discarded. The method also includes identifying at least one decoder stage of a row or column decoder corresponding to a unit of pixels to be discarded. The row or column decoder has a stipulated minimum pulse duration for a typical decoder pulse. The method also includes generating one or more burst pulses. Each burst pulse has a duration that is less than the stipulated minimum pulse duration of the typical decoder pulse of the row or column decoder. The method also includes transmitting the one or more burst pulses to the row or column decoder to traverse through the at least one identified decoder stage corresponding to the unit of pixels to be discarded. Other embodiments of the method are also described.

Other aspects and advantages of embodiments of the present invention will become apparent from the following detailed description, taken in conjunction with the accompanying drawings, illustrated by way of example of the principles of the invention.

BRIEF DESCRIPTION OF THE DRAWINGS

Throughout the description, similar reference numbers may be used to identify similar elements.

DETAILED DESCRIPTION

Figure 1:
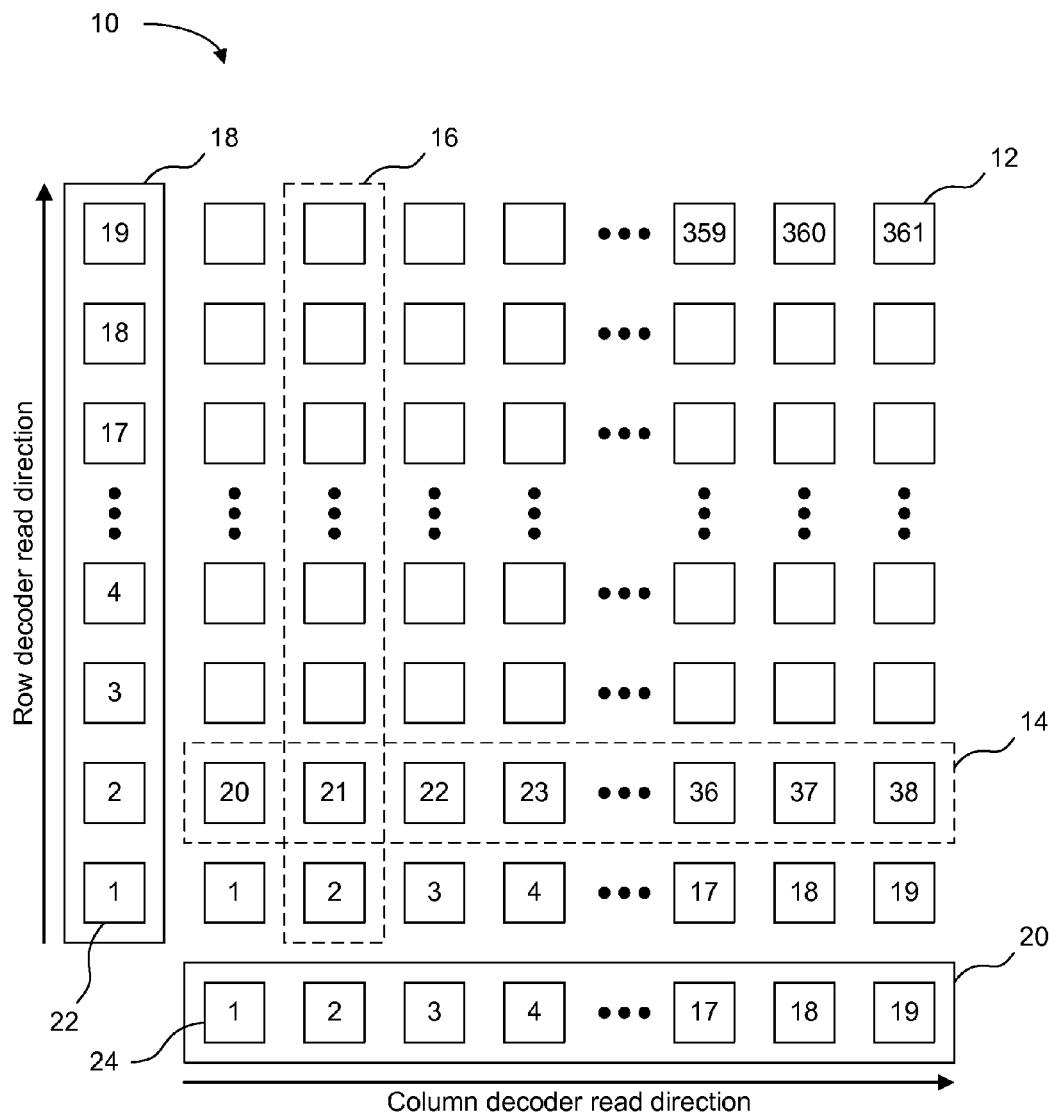
FIG. 1 depicts a schematic diagram of a portion of a conventional imaging device.

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment of the present invention. Thus, the phrases "in one embodiment," "in an embodiment," and similar language throughout this specification may, but do not necessarily, all refer to the same embodiment.

While many embodiments are described herein, at least some of the described embodiments provide functionality to implement a burst switching mode which is faster and more efficient in terms of pixel readout operations. Embodiments of the burst switching mode allow row and/or column decoder stages to be jumped by quickly traversing past one or more stages without reading out the corresponding pixel data or, alternatively, discarded any pixel data that might be read out.

FIG. 1 depicts a schematic diagram of a portion of a conventional imaging device 10. The illustrated portion of the imaging device 10 includes a plurality of pixels 12 arranged in rows 14 and columns 16. The arrangement of pixels 12 forms a pixel array. The illustrated pixel array includes nineteen rows and nineteen columns of pixels 12. For reference, index numbers may be used to refer to specific pixels 12 in the pixel array. In the illustrated arrangement, the pixels 12 are indexed using integer numbers in sequential order from one to 361.

Each pixel 12 integrates an electrical signal during an exposure period. The magnitude of the electrical signal integrated on a specific pixel 12 depends on the type of light sensitivity of the pixel 12, the intensity of light to which the pixel 12 is exposed, and the duration of the exposure period.

The imaging device 10 also includes a row decoder 18 and a column decoder 20. The row decoder 18 includes a decoder stage 22 for each row 14 in the pixel array. In this embodiment, the row decoder 18 includes nineteen decoder stages 22 because there are nineteen rows 14 of pixels 12 in the pixel array. Similarly, the column decoder 20 includes a decoder stage 24 for each column 16 in the pixel array. In this embodiment, the column decoder 20 includes nineteen decoder stages 24 because there are nineteen columns 16 of pixels 12 in the pixel array.

Figure 2:
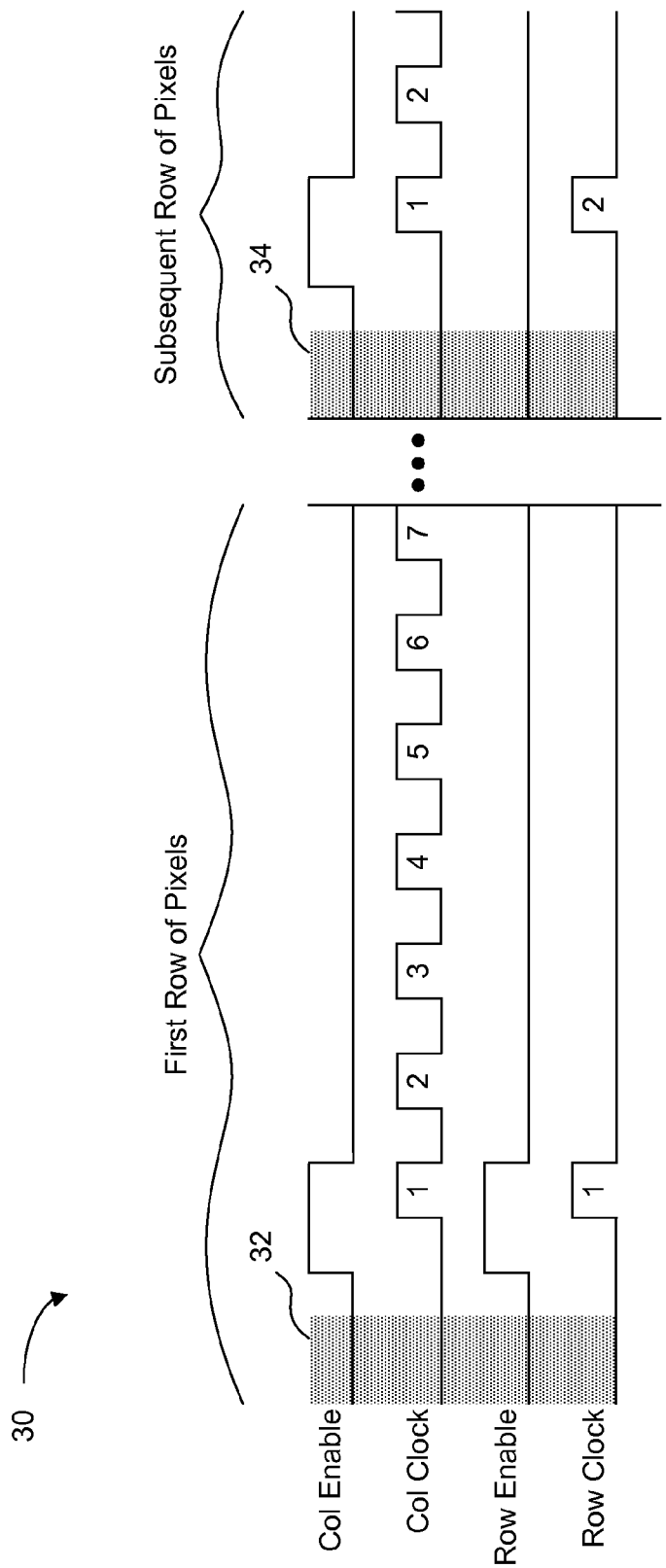
FIG. 2 depicts a timing diagram of conventional enable and clock signals used in conjunction with the conventional pixel array of FIG. 1.

Each decoder 18, 20 receives an enable signal and a clock signal. These signals are generated by other conventional components within the imaging device 10 that are not shown in FIG. 1. FIG. 2 depicts a timing diagram 30 of conventional enable and clock signals used in conjunction with the conventional pixel array of FIG. 1. More specifically, the row decoder 18 receives a "row enable" signal and a "row clock" signal. Similarly, the column decoder 20 receives a "column enable" signal and a "column clock" signal. The enable signal also may be referred to as a select signal.

In general, the enable and clock signals are used to read out pixel data from the individual pixels 12 within the pixel array. One conventional approach to reading out pixel data is to sequentially read out the data from each pixel 12 in the first row, and then read out the data from each pixel 12 in the next row, and so on. The readout period for each row 14 of pixels 12 may be referred to as a frame. In FIG. 2, the start of the first frame is indicated by the shaded area 32, and the start of the second frame is indicated by the shaded area 34. With reference to FIG. 1, the values for pixels 1-19 in the first row 14 corresponding to the first row decoder stage 22 may be read out in the first frame, the values for pixels 20-38 in the second row 14 corresponding to the second row decoder stage 22 may be read out in the second frame, and so on.

In conventional operation, the row decoder 18 receives the row enable signal to enable selection of a specific row 14 within the pixel array. The row decoder 18 also receives the first row clock signal pulse ("1") to select the first row 14 of pixels 12. In coordination with the row enable and clock signals, the column decoder 20 receives the column enable signal to enable selection of a specific column 16 within the pixel array. The column decoder 20 also receives a series of column clock signal pulses ("1" through "7" are shown) to sequentially select the corresponding pixels 12 within the selected row 14 of the pixel array. Although FIG. 2 only shows the column clock signals 1-7 for the first frame, the column decoder 20 may cycle through all of the column decoder stage 24 (i.e., stages 1-19) before beginning the next frame. This results in transferring the integrated electrical signals from the individual pixels 12 to other conventional processing components within the imaging device 10 (e.g., to store or display the representative image). This process is repeated for the second row 14 of pixels 12 during the second frame, which is indicated by the second start of frame 34. Eventually, all of the pixel values are read out for all of the columns 16 in each of the rows 14 of the pixel array.

Figure 3:
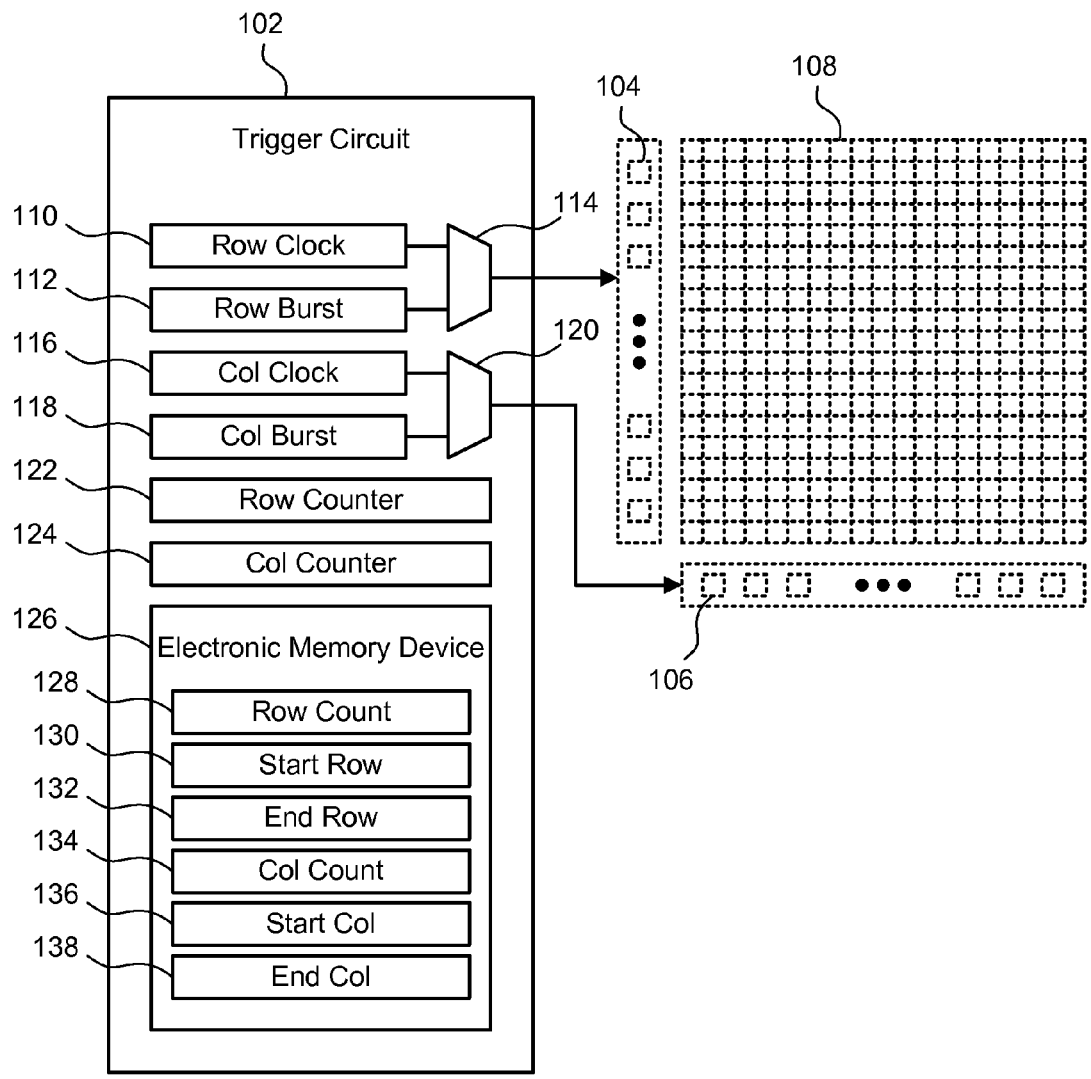
FIG. 3 depicts a schematic block diagram of one embodiment of a trigger circuit for use in traversing row and/or column decoder stages for a pixel array.

FIG. 3 depicts a schematic block diagram of one embodiment of a trigger circuit 102 for use in traversing row and/or column decoder stages 104, 106 for a pixel array 108. The illustrated trigger circuit 102 includes several components that facilitate a burst switching mode to allow faster and more efficient traversal of the row and/or column decoder stages 104, 106 during readout of the pixel values for the pixel array 108. Although the trigger circuit 102 is shown and described with certain components and functionality, other embodiments of the trigger circuit 102 may include fewer or more components to implement less or more functionality. For example, the illustrated trigger circuit 102 does not include row or column enable circuitry, although other embodiments may incorporate circuitry to generate and/or transmit such signals to the row and column decoders.

The illustrated trigger circuit 102 includes a row clock signal generator 110, a row burst pulse generator 112, and a row selector 114. Although the row clock signal generator 110 and the row burst pulse generator 112 are shown as separate components in the trigger circuit 102, in some embodiments the functionality of these two components may be integrated into a single component, in which case it may be possible to omit the row selector 114.

In normal readout operations, the row clock signal generator 110 generates row clock signal pulses that are used to traverse through the row decoder stages 104. These row clock signal pulses are generated in compliance with stipulated design specifications so that the row traversal occurs in a predictable manner within the functional performance requirements of the corresponding decoder and pixel components. One of the stipulated design specifications of typical clock signal generators is a duration of the period for which the clock signal is asserted and/or deasserted. By using a stipulated duration (or longer) for the asserted row clock signal pulses, the performance of the row decoder and pixels is predictable, because component testing can confirm that the various components work reliably with such clock signals. In one example, the row clock signal is approximately 4 MHz, which corresponds to a period of about 250 ns for the row clock signal. In this example, the stipulated minimum duration of each row clock signal pulse may be approximately 125 ns (i.e., one half of the period of the row clock signal). Other embodiments may use different frequencies for the row clock signal, which may result in longer or shorter periods and stipulated minimum durations. During normal readout of pixel values, the row selector 114 is controlled by other components such as a processing device, a state machine, or other logic (not shown) to pass the row clock signal pulses to the row decoder stages 104.

Figure 4A:
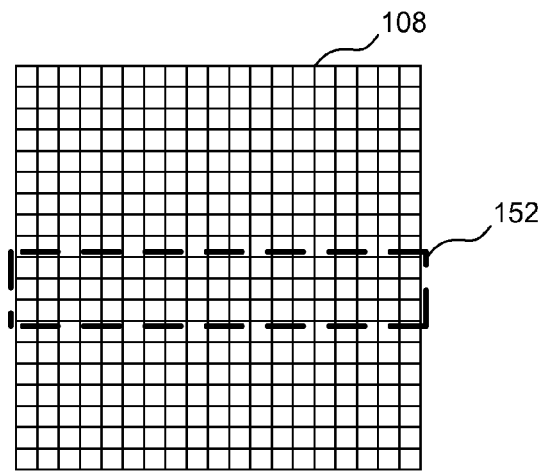
FIG. 4A depicts a schematic diagram of one embodiment of a subset of selected pixels in a row arrangement within a pixel array.

It may be advantageous in some circumstances to bypass one or more rows of pixels 12 that are deemed unnecessary for the application in which the imaging device is deployed. For example, in some embodiments, it may be sufficient to read out pixel values from only one or a few rows within the pixel array 108 for optical navigation or optical recognition applications. FIG. 4A depicts a schematic diagram of one embodiment of a subset 152 of selected pixels in a row arrangement within the pixel array 108.

In order to bypass one or more row decoder stages 104 (and the corresponding rows of pixels), the row selector 114 may be controlled to pass row burst pulses from the row burst pulse generator 112 instead of the typical row clock signal pulses. In one embodiment, the row burst pulse generator 112 generates burst pulses that are shorter in duration than the typical row clock signal pulses. In other words, the burst pulses have a duration that is shorter than the stipulated minimum pulse duration used by the row decoder stages 104. In some embodiments, the duration of the burst pulse may be indicated relative to the stipulated minimum pulse duration of the typical clock signal pulses. For example, in some embodiments the duration of the burst pulses is approximately one sixth (e.g., 16.67%) of the stipulated minimum duration for the row clock signal. As a specific example, if the period of the row clock signal is 250 ns, then the corresponding period of the row burst pulses is approximately 42 ns (with a corresponding frequency of 24 MHz), and the duration of each burst pulse is approximately 21 ns (e.g., one half of the period). In another embodiment, the duration of the burst pulses is less than approximately 50% of the stipulated minimum pulse duration. In another embodiment, the duration of the burst pulses is less than approximately 25% of the stipulated minimum pulse duration. In another embodiment, the duration of the burst pulses is less than approximately 10% of the stipulated minimum pulse duration. Other embodiments may use other percentages between about 5-95% of the stipulated minimum pulse duration. Also, in some embodiments the row burst pulse generator 112 may generate burst pulses that are closer together (i.e., have a shorter period, or a shorter deassertion duration between pulses). One example of such row burst pulses is shown in FIG. 6 and described in more detail below with reference to FIGS. 5 and 6.

The illustrated trigger circuit 102 also includes a column clock signal generator 116, a column burst pulse generator 118, and a column selector 120. Although the column clock signal generator 116 and the column burst pulse generator 118 are shown as separate components in the trigger circuit 102, in some embodiments the functionality of these two components may be integrated into a single component, in which case it may be possible to omit the column selector 120.

In normal readout operations, the column clock signal generator 116 generates column clock signal pulses that are used to traverse through the column decoder stages 106. These column clock signal pulses are generated in compliance with stipulated design specifications so that the column traversal occurs in a predictable manner within the functional performance requirements of the corresponding decoder and pixel components. As mentioned above, one of the stipulated design specifications of typical clock signal generators is a duration of the period for which the clock signal is asserted and/or deasserted. By using a stipulated duration (or longer) for the asserted column clock signal pulses, the performance of the column decoder and pixels is predictable, because component testing can confirm that the various components work reliably with such clock signals. In one example, the column clock signal is approximately 4 MHz, which corresponds to a period of about 250 ns for the column clock signal. In this example, the stipulated minimum duration of each column clock signal pulse may be approximately 125 ns (i.e., one half of the period of the column clock signal). Other embodiments may use different frequencies for the column clock signal, which may result in longer or shorter periods and stipulated minimum durations. During normal readout of pixel values, the column selector 120 is controlled by other components such as a processing device, a state machine, or other logic (not shown) to pass the column clock signal pulses to the column decoder stages 106.

Figure 4B:
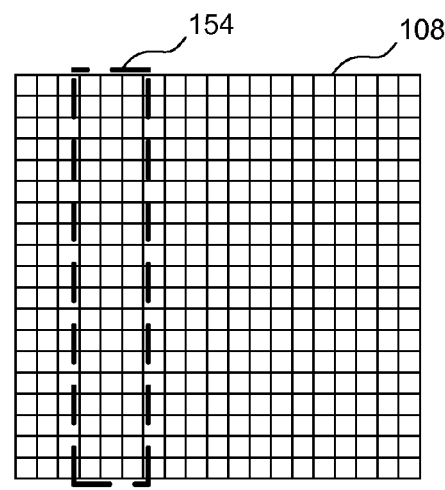
FIG. 4B depicts a schematic diagram of one embodiment of a subset of selected pixels in a column arrangement within a pixel array.

It may be advantageous in some circumstances to bypass one or more columns of pixels 12 that are deemed unnecessary for the application in which the imaging device is deployed. FIG. 4B depicts a schematic diagram of one embodiment of a subset 154 of selected pixels in a column arrangement within a pixel array 108.

In order to bypass one or more column decoder stages 106 (and the pixel in the corresponding column), the column selector 120 may be controlled to pass column burst pulses from the column burst pulse generator 118 instead of the typical column clock signal pulses. In one embodiment, the column burst pulse generator 118 generates burst pulses that are shorter in duration than the typical row clock signal pulses. In other words, the burst pulses have a duration that is shorter than the stipulated minimum pulse duration used by the column decoder stages 106. In some embodiments, the duration of the burst pulse may be indicated relative to the stipulated minimum pulse duration of the typical clock signal pulses. For example, in some embodiments the duration of the burst pulses is approximately one sixth (e.g., 16.67%) of the stipulated minimum duration for the column clock signal. As a specific example, if the period of the column clock signal is 250 ns, then the corresponding period of the column burst pulses is approximately 42 ns (with a corresponding frequency of 24 MHz), and the duration of each burst pulse is approximately 21 ns (e.g., one half of the period). In another embodiment, the duration of the burst pulses is less than approximately 50% of the stipulated minimum pulse duration. In another embodiment, the duration of the burst pulses is less than approximately 25% of the stipulated minimum pulse duration. In another embodiment, the duration of the burst pulses is less than approximately 10% of the stipulated minimum pulse duration. Other embodiments may use other percentages between about 5-95% of the stipulated minimum pulse duration. Also, the column burst pulse generator 118 may generate burst pulses that are closer together (i.e., have a shorter period, or a shorter deassertion duration between pulses). One example of such column burst pulses is shown in FIG. 8 and described in more detail below with reference to FIGS. 7 and 8.

Figure 4C:
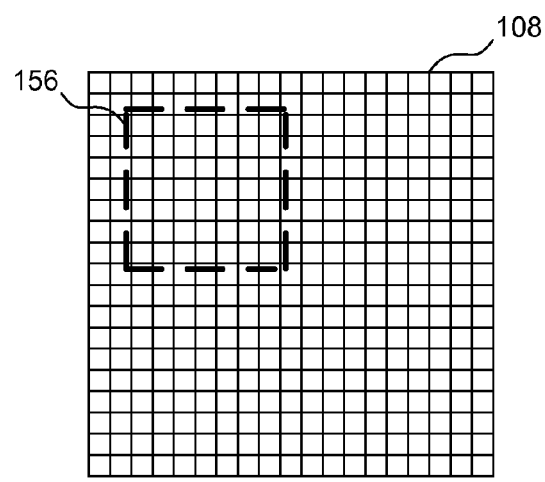
FIG. 4C depicts a schematic diagram of one embodiment of a subset of selected pixels in a sub-window arrangement within a pixel array.

In some embodiments, the functionality provided by the row burst pulse generator 112 and the column burst pulse generator 118 can be used in combination to bypass both rows and columns within the pixel array 108. In light of the description herein, it can be understood that rows of pixels may be jumped, or discarded, either before or after reading out some of the pixel values. Similarly, columns of pixels may be jumped, or discarded, either before or after reading out some of the pixel values. By jumping or quickly traversing past rows and columns in combination, it is possible to quickly obtain pixel values for a subset of selected pixels within the pixel array 108. FIG. 4C depicts a schematic diagram of one embodiment of a subset 156 of selected pixels in a sub-window arrangement within a pixel array 108. Also, another example of using a combination of row and column burst pulses to obtain pixel values for a subset of selected pixels in a sub-window of the pixel array 108 is shown in FIG. 10 and described in more detail below with reference to FIGS. 9 and 10.

The illustrated trigger circuit 102 of FIG. 3 also includes row and column counters 122 and 124. Each counter generates count signals and stores count values within an electronic memory device 126. Specifically, the row counter 122 generates a row count value 128, and the column counter 124 generates a column count value 134. The counters 122 and 124 and count values 128 and 134 are used to track the current row and column decoder stages 104 and 106, respectively. The electronic memory device 126 also stores a start row value 130 and an end row value 132 to indicate the first and last rows in the pixel array 108 for which pixel information will be obtained. The pixel information for the remaining rows will not be obtained or will be obtained temporarily and discarded. Similarly, the electronic memory device 126 also stores a start column value 136 and an end column value 138 to indicate the first and last columns in the pixel array 108 for which pixel information will be obtained. The pixel information for the remaining columns will not be obtained or will be obtained temporarily and discarded.

Although the illustrated embodiment only includes one value for each of the starting and ending rows and columns, other embodiments may include more detailed and/or complex row and column information in order to read out different configurations of pixels within the pixel array 108. For example, the electronic memory device 126 may include a bitmap or other indication of values for multiple pixels within the pixel array 108 to indicate which pixels will be read out, which pixels will be discarded, and/or a combination of these. As another example, the electronic memory device 126 may include values for various ranges of rows and/or columns. In this way, it is possible to read out pixels in different columns of different rows, so that a different pattern of pixels could be read out for each row.

Figure 5:
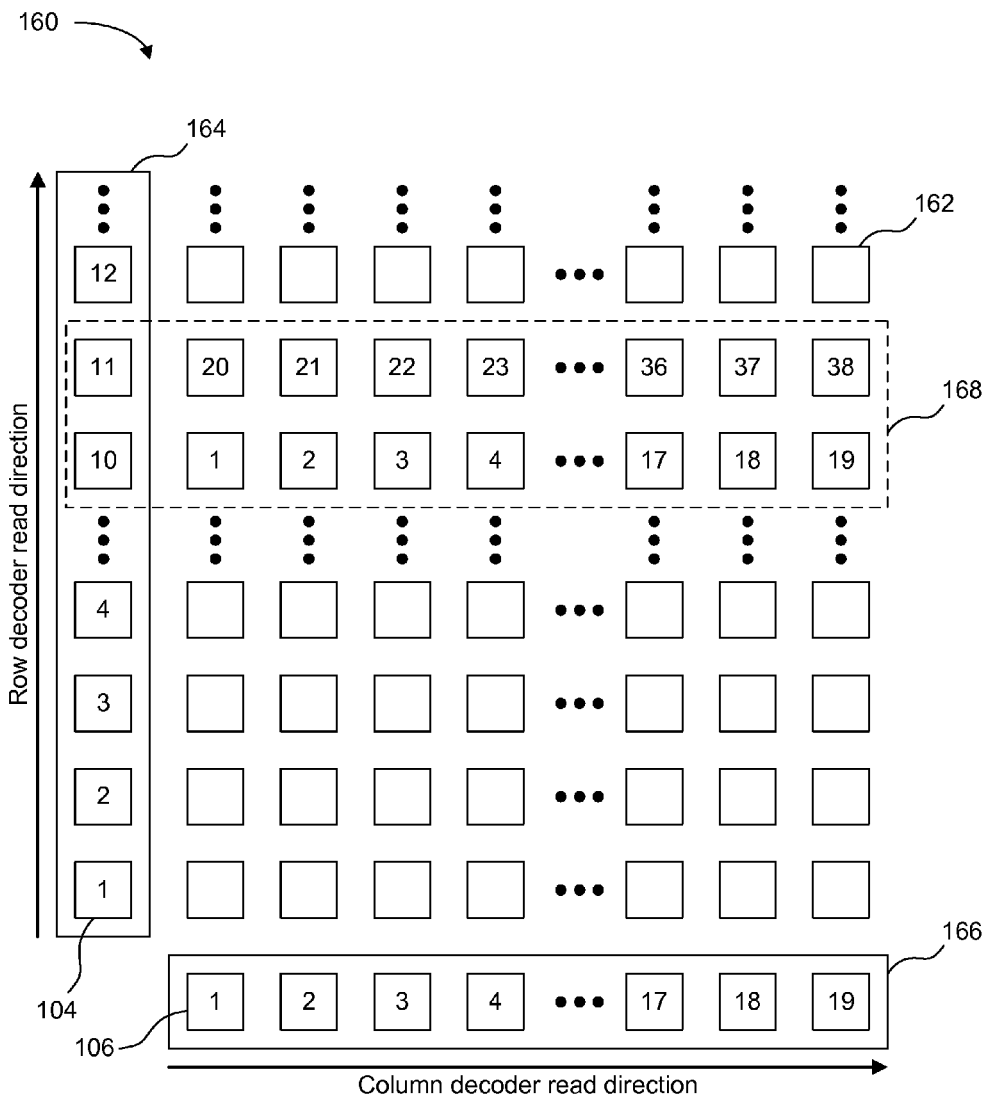
FIG. 5 depicts a schematic diagram of one embodiment of a partial imaging circuit configured to read pixels from selected rows.
Figure 6:
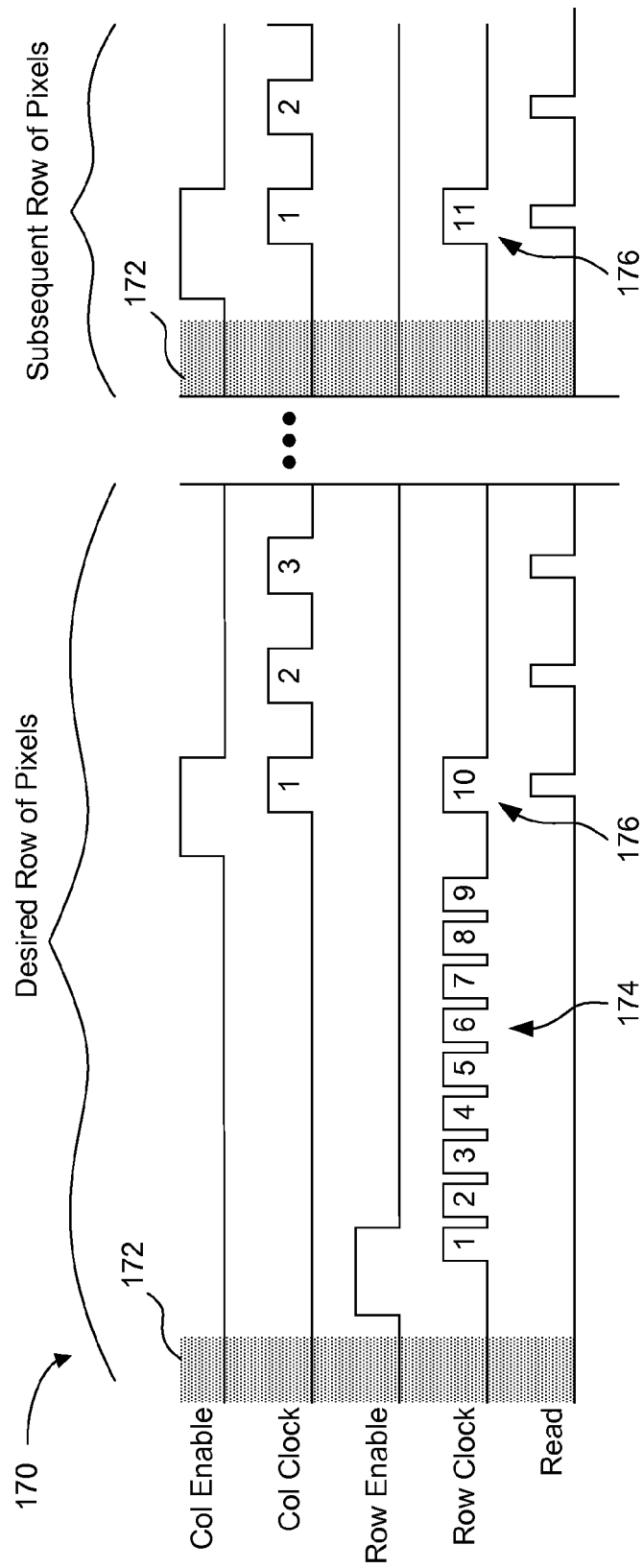
FIG. 6 depicts a timing diagram of one embodiment of timing waveforms that may be used to implement the burst pulses for the row jumping of FIG. 5.

FIG. 5 depicts a schematic diagram of one embodiment of a partial imaging circuit 160 configured to read pixels from selected rows. The illustrated imaging circuit 160 includes pixels 162 which form a pixel array 108. The illustrated imaging circuit 160 also includes a row decoder 164 with row decoder stages 104 and a column decoder 166 with column decoder stage 106. The selected rows correspond to the row decoder stages 10 and 11. In some embodiments, the group of pixels (i.e., pixels 1-20) formed by the selected rows is referred to as a sub-window 168 of selected pixels.

FIG. 6 depicts a timing diagram 170 of one embodiment of timing waveforms that may be used to implement the burst pulses for the row jumping of FIG. 6. In the illustrated embodiment, the row enable signal is asserted after the start of frame 172. At approximately the same time, the row clock signal is asserted with row burst pulses 174 (i.e., pulses 1-9) to quickly traverse through the first nine row decoder stages 104 without obtaining pixel values for the corresponding pixels in those rows. After the sequence of row burst pulses 174 is completed, the row clock signal is asserted with a typical row clock signal pulse 176 (rather than a row burst pulse) to select the row corresponding to the row decoder stage 10. The column enable signal is also asserted, and the column clock signal is asserted using typical column clock signal pulses (rather than column burst pulses) in order to obtain the pixel data for the corresponding pixel in each column. In one embodiment, the pixel data is obtained during the corresponding pulse of the read signal. This readout condition continues until all pixel values for the row are obtained. The next frame then begins at the following start of frame 172, and the row clock signal is asserted with a typical row clock signal pulse 176 (rather than row burst pulses). The column enable and clock signals are then asserted in a similar manner to read out the pixel values in the row corresponding to the row decoder stage 11.

Figure 7:
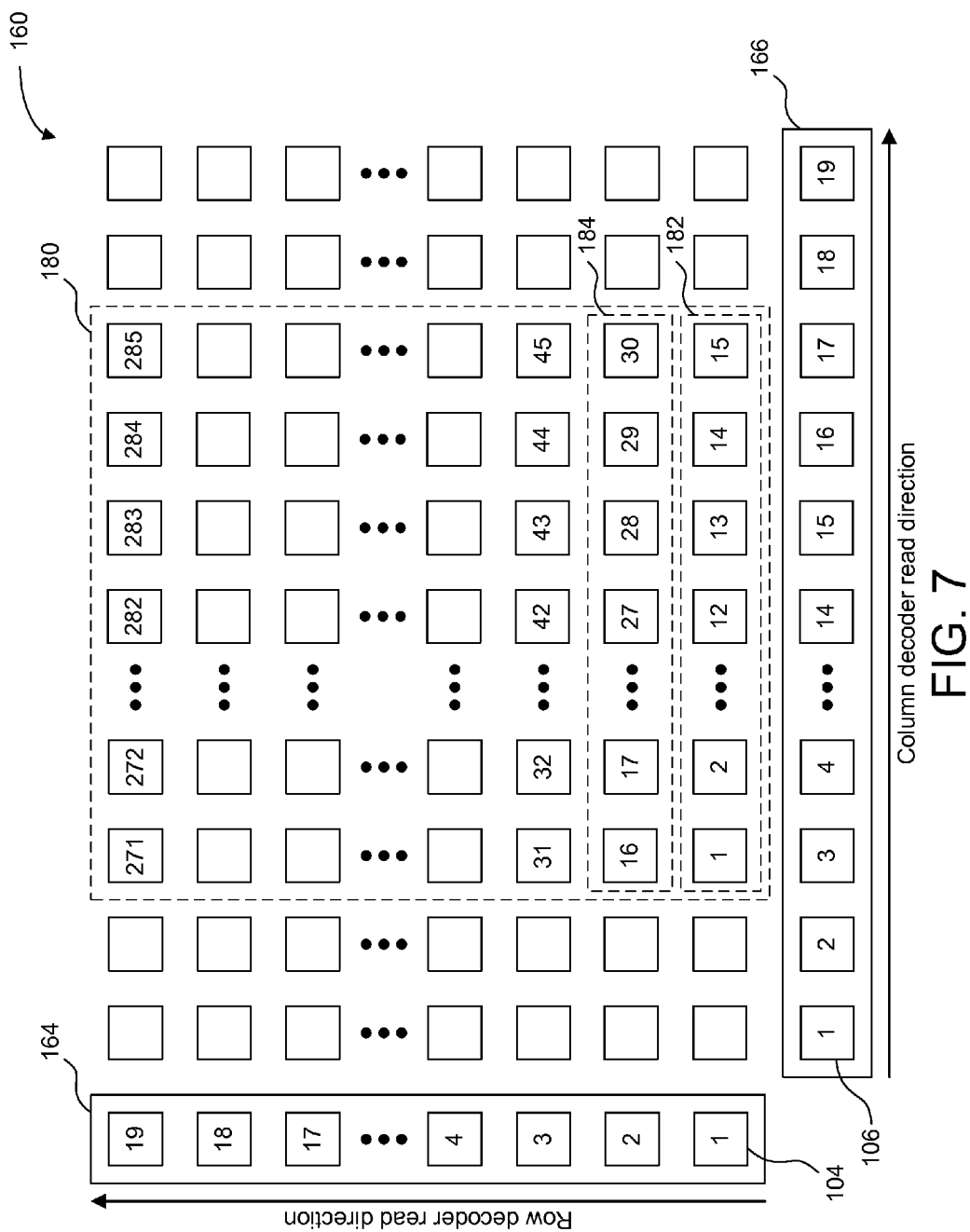
FIG. 7 depicts a schematic diagram of one embodiment of a partial imaging circuit configured to read pixels from selected columns.
Figure 8:
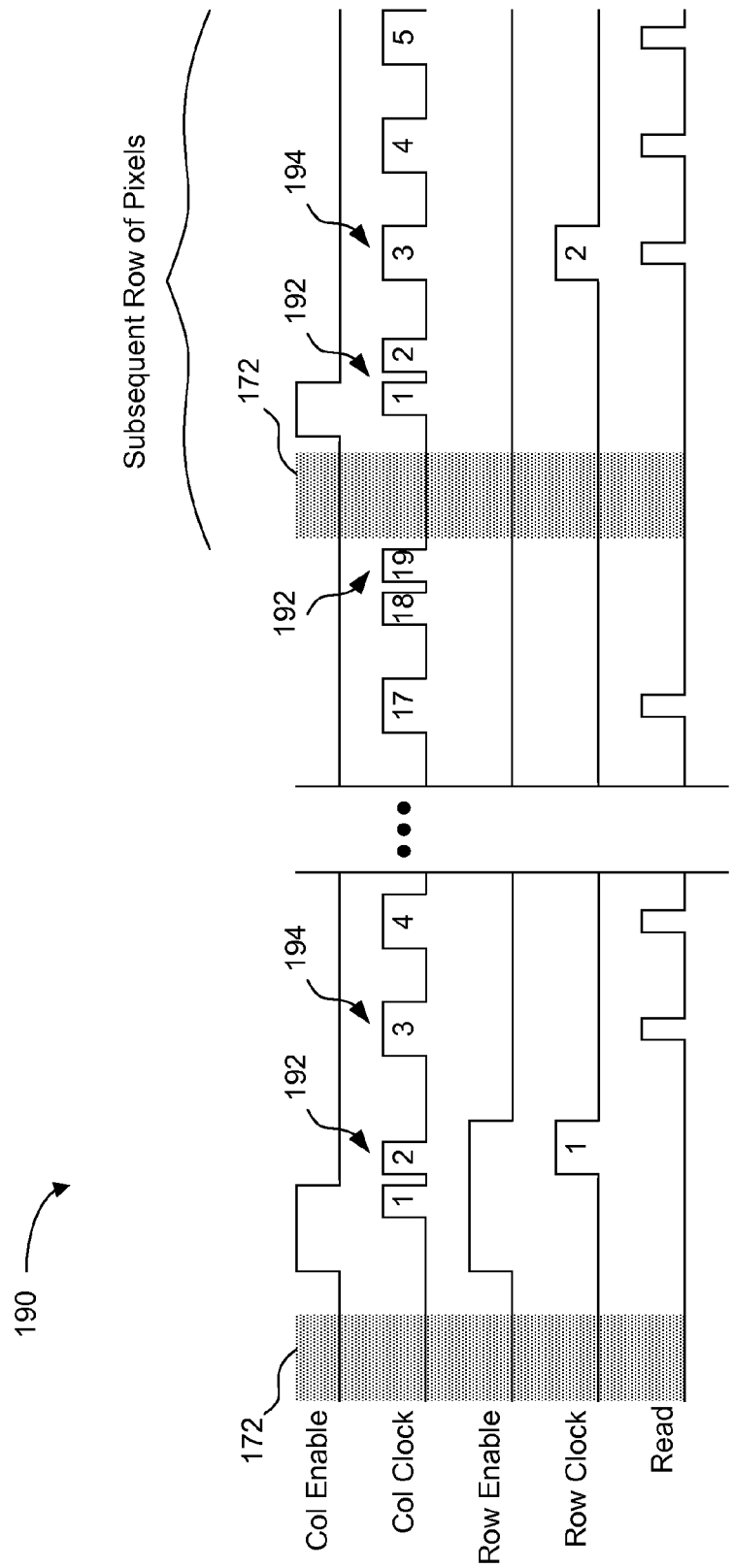
FIG. 8 depicts a timing diagram of one embodiment of timing waveforms that may be used to implement the burst pulses for the column jumping of FIG. 7.

FIG. 7 depicts a schematic diagram of one embodiment of a partial imaging circuit 160 configured to read pixels from selected columns. The illustrated imaging circuit 160 includes similar components as shown in FIG. 5 and described above. However, the selected columns of pixels correspond to the column decoder stages 3-17, rather than to the row decoder stages 10 and 11. In some embodiments, the group of pixels (i.e., pixels 1-285) formed by the selected columns is referred to as a sub-window 180 of selected pixels. Also, each subset of selected pixels in each row may be referred to as sub-rows 182 and 184 of selected pixels.

FIG. 8 depicts a timing diagram 190 of one embodiment of timing waveforms that may be used to implement the burst pulses for the column jumping of FIG. 7. In the illustrated embodiment, the column enable signal is asserted after the start of frame 172. At approximately the same time, the column clock signal is asserted with column burst pulses 192 (i.e., pulses 1 and 2) to quickly traverse through the first two column decoder stages 106 without obtaining pixel values for the corresponding pixels in those column. At about the same time, or after the sequence of column burst pulses 192 is completed, the row clock signal is asserted with a typical row clock signal pulse (rather than a row burst pulse) to select the row corresponding to the row decoder stage 1. The column clock signal is asserted using typical column clock signal pulses 194 (rather than column burst pulses) in order to obtain the pixel data for the corresponding pixel in column 3. In one embodiment, the pixel data is obtained during the corresponding pulse of the read signal. This readout condition continues until all pixel values through column 17 are obtained. The column clock signal is then asserted using additional column burst pulses 192 to quickly traverse past the remaining columns, without obtaining (or obtaining and discarding) the pixel data for the corresponding pixels. Alternatively, in some embodiments, the column clock signal is simply not asserted, and the row clock signal is asserted to move to the next row without even attempted to bypass the remaining columns. The next frame begins at the following start of frame 172, and the column clock signal is asserted using column burst pulses 192 to again bypass the pixels in the first two columns. The row and column clock signals are then asserted with typical row and column clock signal pulses 194 (rather than burst pulses) to read out the pixel values in columns 3-17 for the second row.

Figure 9:
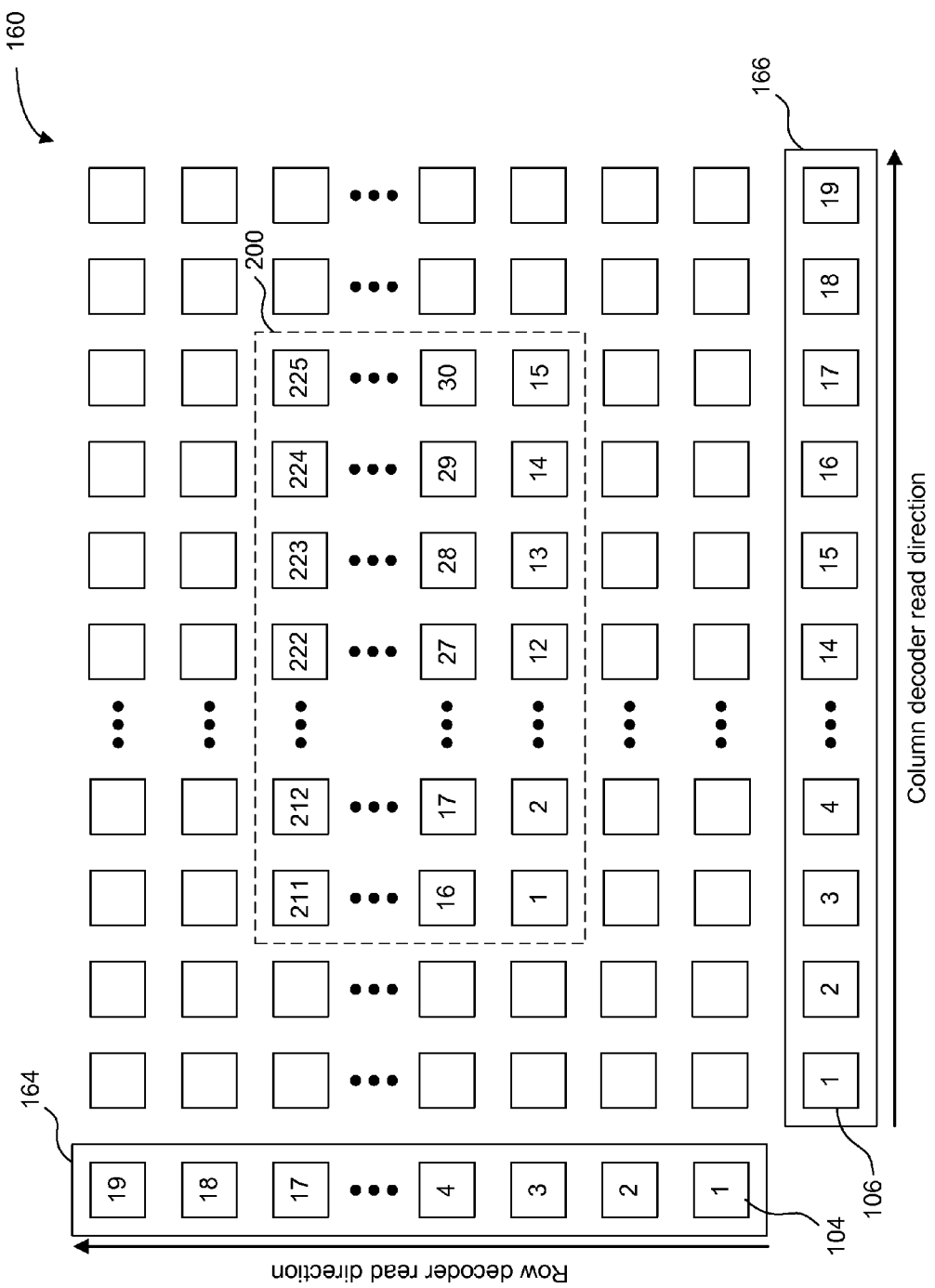
FIG. 9 depicts a schematic diagram of one embodiment of a partial imaging circuit configured to read pixels from a selected sub-window of pixels.
Figure 10:
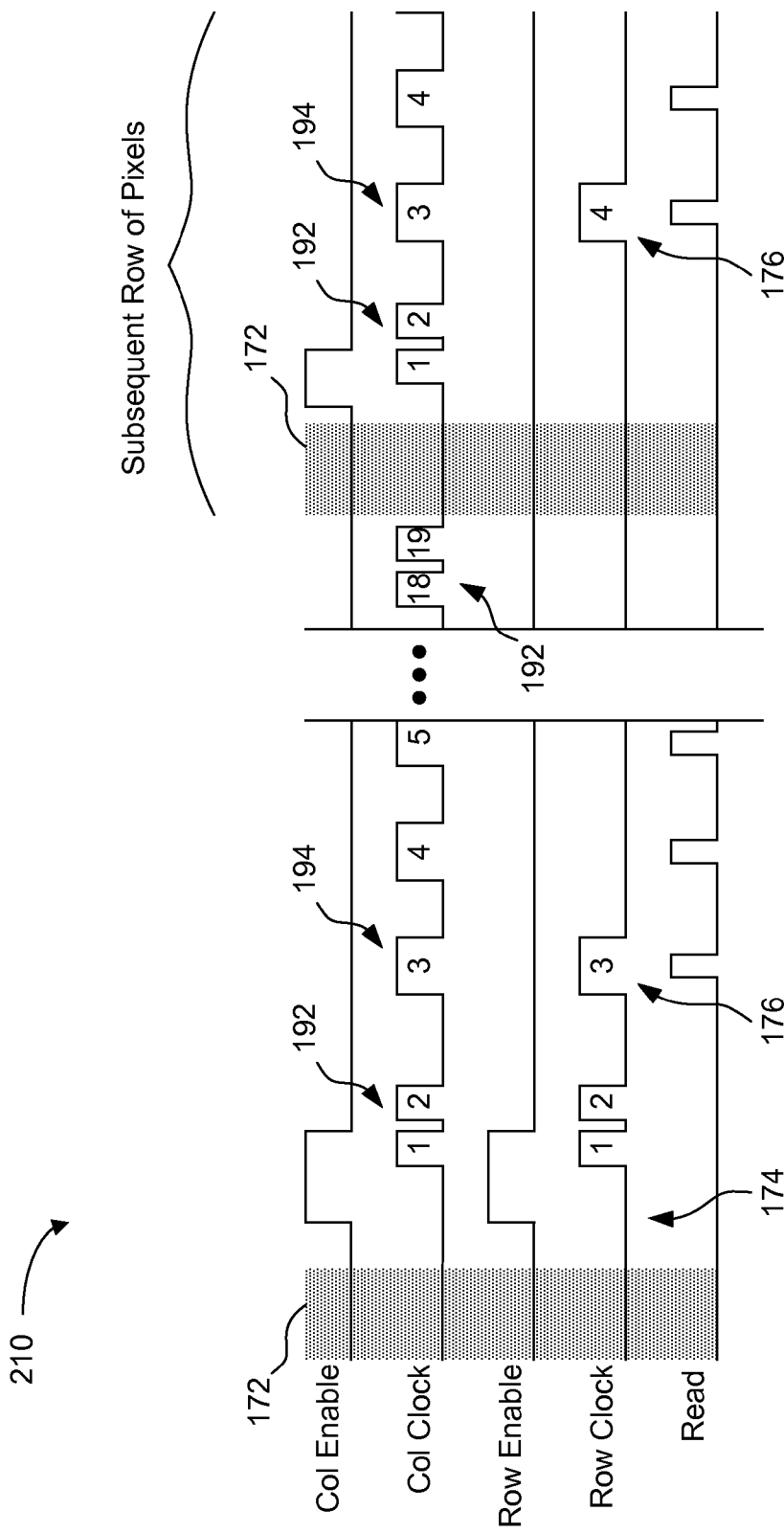
FIG. 10 depicts a timing diagram of one embodiment of timing waveforms that may be used to implement the burst pulses for the row and column jumping of FIG. 9.

FIG. 9 depicts a schematic diagram of one embodiment of a partial imaging circuit 160 configured to read pixels from a selected sub-window 200 of pixels. The selected sub-window 200 of pixels omits pixels from some of the rows and some of the columns. In some aspects, this is simply a combination of the functionality described previously for the discarding of rows and columns independently.

FIG. 10 depicts a timing diagram 210 of one embodiment of timing waveforms that may be used to implement the burst pulses for the row and column jumping of FIG. 9. In this embodiment, burst pulses are used for both the row and column clock signals to jump past the first two rows and the first two columns. Typical row and column clock signals are then used to obtain reliable pixel values for the corresponding pixels of the selected row. In one embodiment, the pixel data is obtained during the corresponding pulses of the read signal. As the row decoder 164 traverses along the various row decoder stages 104, the pixels corresponding to columns 1, 2, 18, and 19 continue to be skipped for the selected rows.

Figure 11:
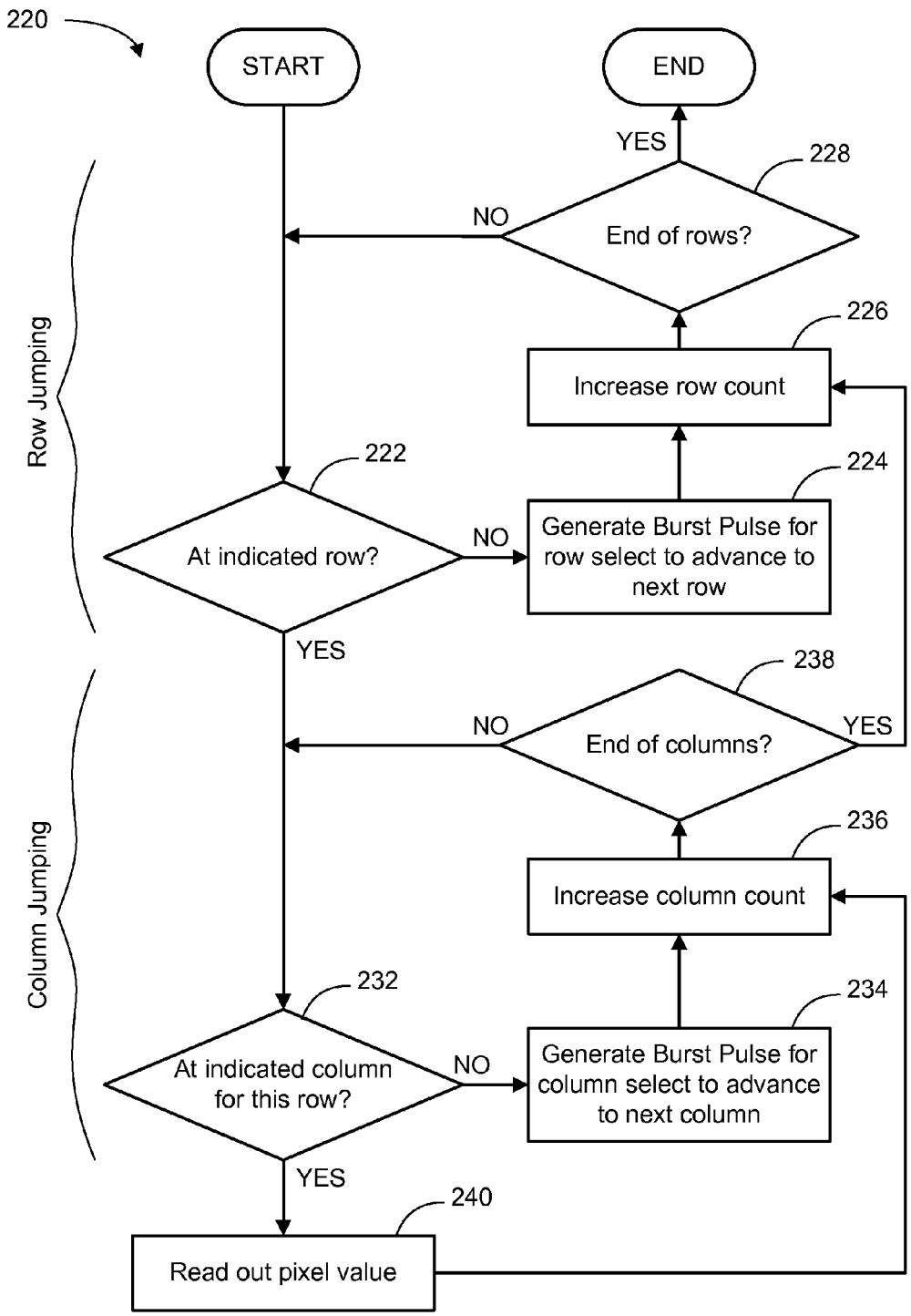
FIG. 11 depicts a flow chart diagram of one embodiment of a method for implementing burst pulses for row and column jumping in a pixel array.

FIG. 11 depicts a flow chart diagram of one embodiment of a method 220 for implementing burst pulses for row and column jumping in a pixel array 108. Although the method 220 is described in conjunction with the embodiments of the trigger circuit 102 and the imaging device 160 described above, embodiments of the method 220 may be implemented with other types of trigger circuits and/or imaging devices. Also, for additional reference, the illustrated method 220 does not incorporate additional processing operations that might be precursor or post-processing operations relative to the functionality to traverse the row and column decoder stages 104 and 106. However, additional operations may be implemented either prior to or after performing the illustrated operations.

The illustrated method 220 starts at block 222, in which the trigger circuit 102 determines whether the selected row decoder stage 104 is at an indicated row. For example, if the trigger circuit 102 decides or in instructed to skip the first four rows of pixels and start obtaining pixel values of pixels in the fifth row, then the trigger circuit 102 may evaluate whether or not the row decoder stage 104 corresponding to the fifth row of pixels is selected. In one embodiment, the row counter 122 tracks the selected row, so the trigger circuit 102 may reference the value of the row count 128 to make this determination. Additionally, the trigger circuit 102 may compare the value of the row count 128 in the electronic memory device 126 to the start row value 130 and/or the end row value 132 to determine if the selected row is within the range of rows that have pixels which are intended to be read out.

If the desired row decoder stage 104 is not selected, then at block 224 the row burst pulse generator 112 generates a row burst pulse that is transmitted to the row decoder 164 to jump to the next row decoder stage 104. At block 226, the trigger circuit 102 also increments the value of the row count 128. After incrementing the value of the row count 128, at block 228 the trigger circuit 102 determines if the row count 128 has reached or exceeded the number of rows in the pixel array 108. If the row count 128 has reached or exceeded the number of rows in the pixel array 108, then the depicted method 220 ends. Otherwise, if the row count 128 has not reached or exceeded the number of rows in the pixel array 108, then the trigger circuit 102 returns to determine if the newly selected row is indicated as a row in which pixel data is to be obtained. Alternatively, the trigger circuit 102 may determine if the row count 128 has reached or exceeded the end row value 132 stored in the electronic memory device 126, in which case the trigger circuit 1012 may stop processing rows if all of the relevant rows have been processed.

In response to determining that a selected row has pixel data which is to be obtained, the trigger circuit 102 may traverse through the columns of the selected row in a similar manner as described above for the rows. In particular, at block 232 the trigger circuit 102 determines whether the selected column decoder stage 106 is at an indicated column. For example, if the trigger circuit 102 decides or is in-instructed to skip the first two columns of pixels and start obtaining pixel values of pixels in the third column, then the trigger circuit 102 may evaluate whether or not the column decoder stage 106 corresponding to the third column of pixels is selected. In one embodiment, the column counter 124 tracks the selected column, so the trigger circuit 102 may reference the value of the column count 134 to make this determination. Additionally, the trigger circuit 102 may compare the value of the column count 134 in the electronic memory device 126 to the start column value 136 and/or the end column value 138 to determine if the selected column is within the range of columns that have pixels which are intended to be read out.

If the desired column decoder stage 106 is not selected, then at block 234 the column burst pulse generator 118 generates a column burst pulse that is transmitted to the column decoder 166 to jump to the next column decoder stage 106. At block 236, the trigger circuit 102 also increments the value of the column count 134. After incrementing the value of the column count 134, at block 238 the trigger circuit 102 determines if the column count 134 has reached or exceeded the number of columns in the pixel array 108. If the column count 134 has reached or exceeded the number of columns in the pixel array 108, then the trigger circuit proceeds to move to the next row by incrementing the row count 128 as described above. Otherwise, if the column count 134 has not reached or exceeded the number of column in the pixel array 108, then the trigger circuit 102 returns to determine if the newly selected column is indicated as a column in which pixel data is to be obtained. Alternatively, the trigger circuit 102 may determine if the column count 134 has reached or exceeded the end column value 138 stored in the electronic memory device 126, in which case the trigger circuit 102 may stop processing column if all of the relevant column have been processed.

If at block 232 the trigger circuit 102 determines that a column is selected in which pixel data is desired, then at block 240 the trigger circuit 102 reads out the pixel value using a typical column clock signal pulse (rather than a column burst pulse). The trigger circuit 102 also increments the column count (possibly with the same column clock signal) and determines if it can move to the next column in the same row or, alternatively if it can move to the next row of pixels. Once all of the indicated pixels are read out, the depicted method 220 then ends.

In an alternative embodiment, the trigger circuit 102 may traverse rows and/or columns without making a determination after each time that the row and/or column count 128 and 134 are incremented. For example, the trigger circuit 102 may determine how many stages need to be traversed and then increment the count that many times, without looping through all of the determination operations shown in FIG. 11. In light of the description herein, it is understood that the same or similar functionality may be implemented in various ways to achieve the same or similar results.

In embodiments described herein, the row decoders propagate along the Y-axis to determine which row is currently being read. The column decoders serve as an output channel for individual pixels as the readout operations propagate along the X-axis. The readout clock signals are generated to meet the stipulated minimum duration for reliability purposes. When pixels are determined to be unnecessary for processing, readout of the corresponding pixel values can be jumped, or skipped, or discarded, by using the burst pulses described herein. As explained above, the burst pulses have a duration that is shorter than the stipulated minimum pulse duration. In this way, undesired pixel values may be purged and not processed.

One potential advantage of using row and column jumping is to enable operating modes where power consumption can be lowered or optimized by completing the pixel readout at a region of interest (i.e., a sub-window) as quickly as possible. Then the imaging device can potentially enter low power or shutdown mode to conserve battery energy. In other words, by reducing the duration of the pixels being turned on, it may be possible to reduce the power consumed by the pixels and the associated signal processing circuitry (e.g., transfer amplifier and ADC). For example, if only 2 out of a total of 20 rows of pixels are used, then embodiments of row jumping using burst pulses within a burst switching mode would reduce the on-time and power of the pixel and associated analog circuitry (not shown) by as much as 90%.

Another purpose of enabling row and column jumping is to enable sub-windowing function in reading images captured by the pixel array. Sub-windowing narrows down to a particular portion of the pixel array (e.g., 12×12 pixels, 8×8 pixels) that is smaller than the physical array (e.g., 20×20 pixels). This feature may be advantageous, in some embodiments, when only a portion of the pixel array is of interest or usable due to crosstalk or fixed pattern noise introduced by optics or package design constraints. As such, no power or processing time is wasted on pixels that are deemed unfit for image processing.

It should also be noted that although embodiments described herein refer to a pixel array with rows and columns, other embodiments may use other arrangements of pixels. Where other arrangements might be implemented, corresponding changes to decoder stages, counter techniques, starting and ending value indications, and other features described above may be altered accordingly to match the various pixel arrangements that might be implemented.

In the above description, specific details of various embodiments are provided. However, some embodiments may be practiced with less than all of these specific details. In other instances, certain methods, procedures, components, structures, and/or functions are described in no more detail than to enable the various embodiments of the invention, for the sake of brevity and clarity.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. An imaging apparatus for obtaining images, the imaging apparatus comprising:
    a pixel array to integrate electrical signals corresponding to incident light from a scene;
    a row decoder coupled to the pixel array, the row decoder to enable a selected row of pixels within the pixel array;
    a column decoder coupled to the pixel array, the column decoder to enable readout of a pixel in a selected column of the selected row within the pixel array; and
    a trigger circuit coupled to at least one of the decoders, wherein the trigger circuit is configured to generate one or more burst pulses to traverse through a corresponding number of decoder stages that correspond to pixels which are identified for discarding, wherein each burst pulse has a duration that is less than a stipulated minimum pulse duration of a typical decoder pulse of the decoders;
    wherein the trigger circuit comprises a row burst generator to generate the one or more burst pulses to traverse through the corresponding number of row decoder stages; and
    wherein the row burst generator is further configured to generate the one or more burst pulses to traverse through the corresponding number of row decoder stages prior to assertion of a first column select signal and a first column clock signal.

2. The imaging apparatus of claim 1, wherein the trigger circuit further comprises a row counter to store a count, wherein a value of the count is associated with a corresponding row within the pixel array.

3. The imaging apparatus of claim 2, wherein the trigger circuit is further configured to use the count of the row counter to track a number of discarded rows within the pixel array and to identify the selected row within the pixel array.

4. The imaging apparatus of claim 1, wherein the trigger circuit is further configured to enable readout of a plurality of pixels in multiple rows within the pixel array and to stop traversal of the decoder stages prior to readout of pixels in a last row within the pixel array in response to a determination that readout is finished for a predetermined number of rows within the pixel array.

5. The imaging apparatus of claim 1, wherein the trigger circuit comprises a column burst generator to generate the one or more burst pulses to traverse through the corresponding number of column decoder stages within the selected row of pixels.

6. The imaging apparatus of claim 5, wherein the trigger circuit further comprises a column counter to store a count, wherein a value of the count is associated with a corresponding column within the pixel array.

7. The imaging apparatus of claim 6, wherein the trigger circuit is further configured to use the count of the column counter to track a number of discarded columns within the pixel array and to identify the selected column within the pixel array.

8. The imaging apparatus of claim 7, wherein the trigger circuit is further configured to purge pixel data associated with the discarded columns.

9. The imaging apparatus of claim 1, wherein the trigger circuit is further configured to enable readout of a plurality of pixels in multiple columns within the selected row of the pixel array and to stop traversal of the decoder stages prior to readout of pixels in a last column within the selected row of the pixel array in response to a determination that readout is finished for a predetermined number of columns within the selected row of the pixel array.

10. The imaging apparatus of claim 1, wherein the duration of each burst pulse is approximately one sixth (⅙) of the stipulated minimum pulse duration of the typical decoder pulse.

11. The imaging apparatus of claim 1, wherein the duration of each burst pulse is less than approximately twenty-five percent (25%) of the stipulated minimum pulse duration of the typical decoder pulse.

12. The imaging apparatus of claim 1, wherein the duration of each burst pulse is less than approximately ten percent (10%) of the stipulated minimum pulse duration of the typical decoder pulse.

13. A trigger circuit for an optical imaging device, the trigger circuit comprising:
  a row decoder output channel coupled to a row decoder of a pixel array, wherein the row decoder is configured to enable a selected row of pixels within the pixel array;
  a column decoder output channel coupled to a column decoder of the pixel array, wherein the column decoder is configured to enable readout of a pixel in a selected column of the selected row of pixels within the pixel array;
    a burst pulse generator coupled to at least one of the decoder output channels, wherein the burst pulse generator is configured to generate one or more burst pulses to traverse through a corresponding number of decoder stages that correspond to pixels which are identified for discarding, wherein each burst pulse has a duration that is less than a stipulated minimum pulse duration of a typical decoder pulse of the decoders;
    further comprising an electronic memory device coupled to the burst pulse generator, wherein the electronic memory device is configured to store:
  a value of a counter, wherein the value is associated with a corresponding decoder stage of at least one of the decoders;
  a start stage indicator, wherein the start stage indicator is associated with an initial decoder stage of at least one of the decoders, where the initial decoder stage is a decoder stage at which the readout of an initial pixel of a subset of selected pixels occurs; and
  an end stage indicator, wherein the end stage indicator is associated with a final decoder stage of at least one of the decoders, wherein the final decoder stage is a decoder stage at which readout of a final pixel of the subset of selected pixels occurs.

14. The trigger circuit of claim 13, further comprising a row clock signal generator coupled to the row decoder output channel, wherein the row clock signal generator is configured to generate a typical row decoder pulse having a duration of at least the stipulated minimum pulse duration of the decoders.

15. The trigger circuit of claim 13, further comprising a column clock signal generator coupled to the column decoder output channel, wherein the column clock signal generator is configured to generate a typical column decoder pulse having a duration of at least the stipulated minimum pulse duration of the decoders.

16. A method for operating decoders of an optical imaging device, the method comprising:
  obtaining an indication of a subset of selected pixels of a pixel array, wherein remaining pixels outside of the subset of selected pixels are identified as pixels to be discarded;
  identifying at least one decoder stage of a row or column decoder corresponding to a unit of pixels to be discarded, wherein the row or column decoder has a stipulated minimum pulse duration for a typical decoder pulse;
  generating one or more burst pulses, wherein each burst pulse has a duration that is less than the stipulated minimum pulse duration of the typical decoder pulse of the row or column decoder;
  transmitting the one or more burst pulses to the row or column decoder to traverse through the at least one identified decoder stage corresponding to the unit of pixels to be discarded;
  further comprising:
  storing a value of a counter in an electronic memory device, wherein the value of the counter is associated with a corresponding decoder stage of the row or column decoder;
  storing a start stage indicator in the electronic memory device, wherein the start stage indicator is associated with an initial decoder stage of the row or column decoder, where the initial decoder stage is a decoder stage at which the readout of an initial pixel occurs for the subset of selected pixels; and
  storing an end stage indicator in the electronic memory device, wherein the end stage indicator is associated with a final decoder stage of the row or column decoder, wherein the final decoder stage is a decoder stage at which the readout of a final pixel occurs for the subset of selected pixels.

* * * * *